H. N. DUFFEE, A. M. CUMMINGS AND C. C. PARKER.
J. A. DUFFEE, ADMINISTRATRIX OF H. N. DUFFEE, DEC'D.
APPARATUS FOR FORMING AND CUTTING PLASTIC MATERIAL.
APPLICATION FILED APR. 5, 1918.
1,317,157.  Patented Sept. 30, 1919.
2 SHEETS—SHEET 1.
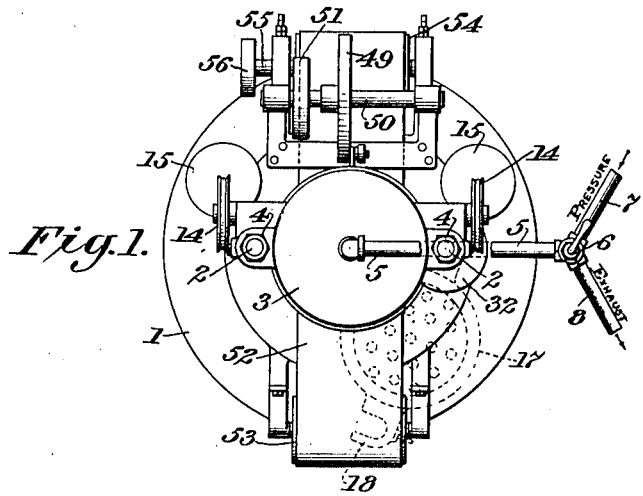
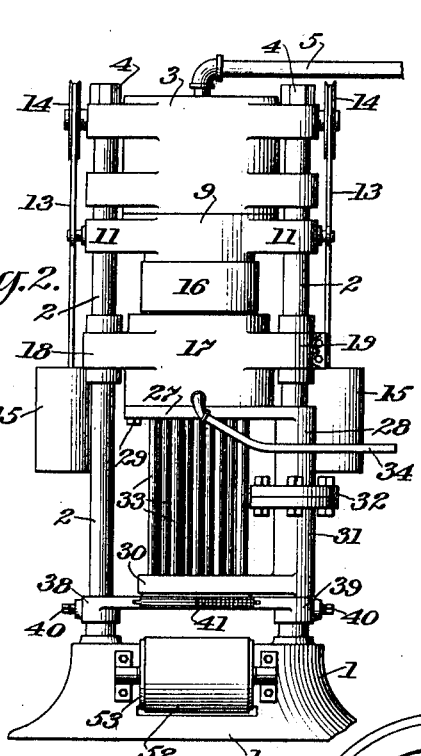
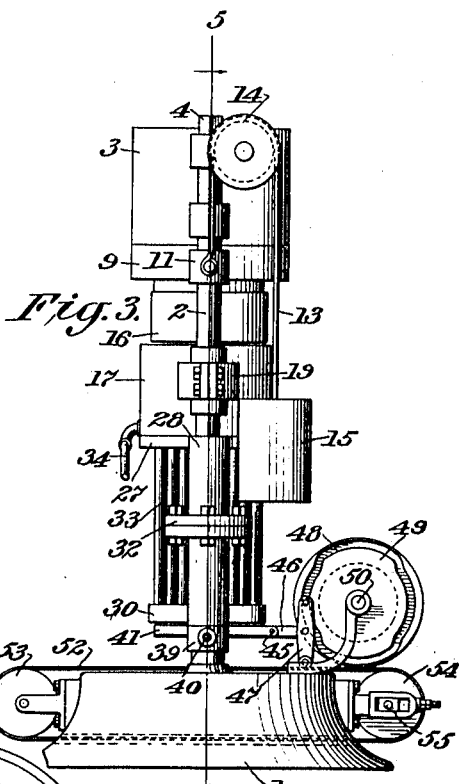
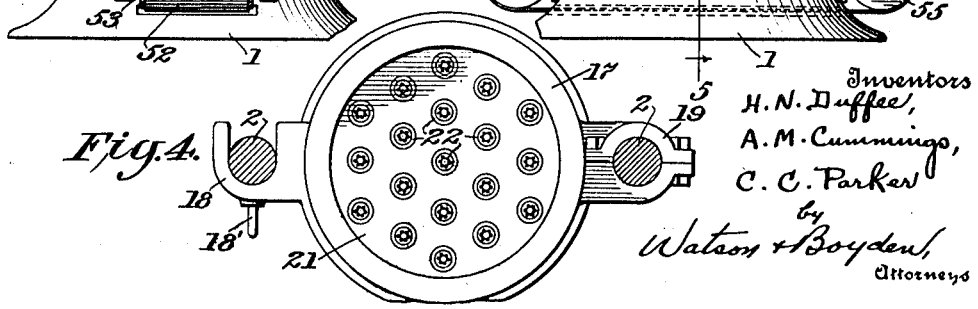

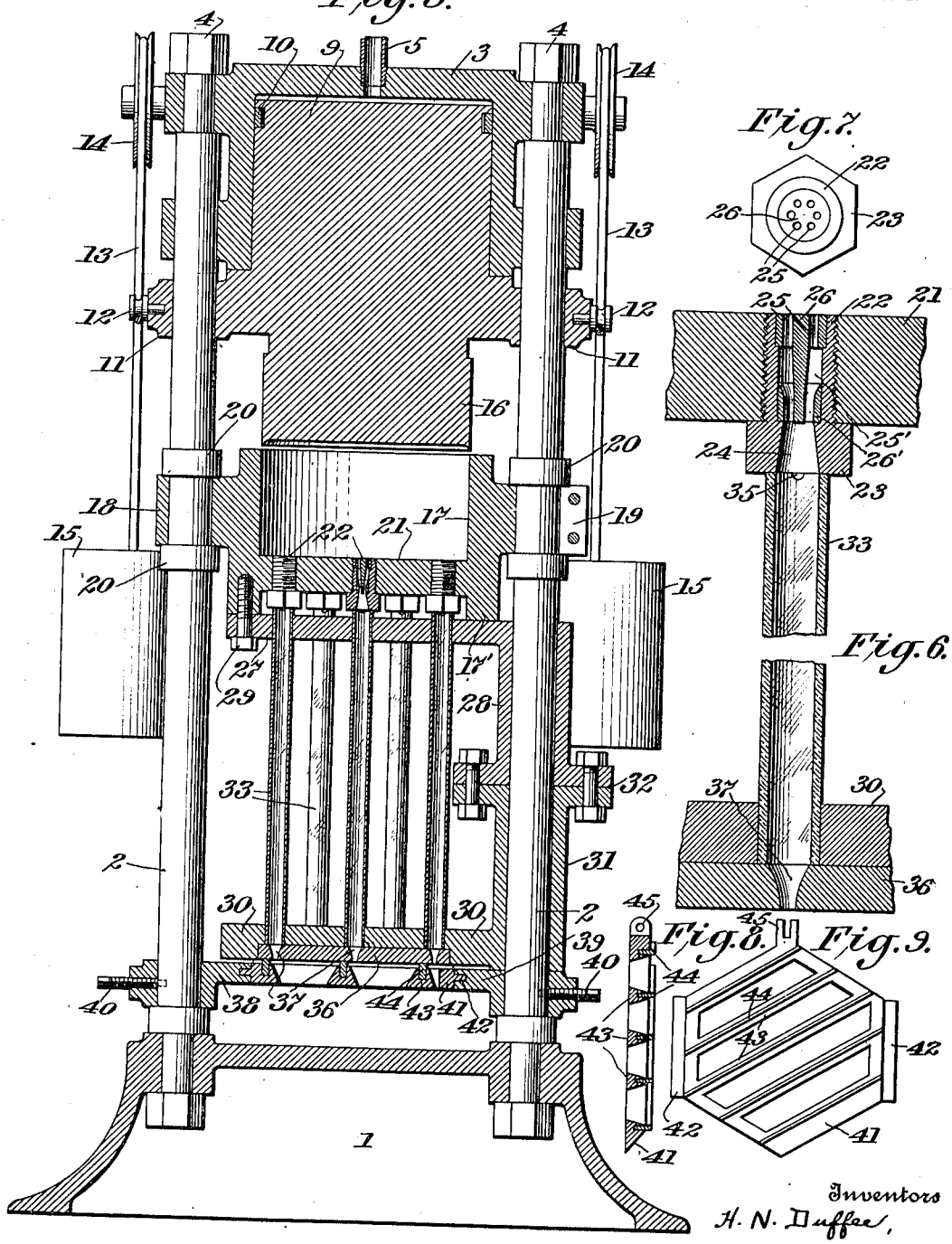

UNITED STATES PATENT OFFICE.

HARLAN N. DUFFEE, OF PHILADELPHIA, PENNSYLVANIA, ARTHUR M. CUMMINGS, OF ABERDEEN, AND CHARLES C. PARKER, OF BALTIMORE, MARYLAND; JENNIE A. DUFFEE ADMINISTRATRIX OF SAID HARLAN N. DUFFEE, DECEASED.

APPARATUS FOR FORMING AND CUTTING PLASTIC MATERIAL.

1,317,157.  Specification of Letters Patent.  Patented Sept. 30, 1919.

Application filed April 5, 1918. Serial No. 226,881.

*To all whom it may concern:*

Be it known that we, HARLAN N. DUFFEE, ARTHUR M. CUMMINGS, and CHARLES C. PARKER, citizens of the United States, residing, respectively, at Philadelphia, in the county of Philadelphia and State of Pennsylvania, at Aberdeen, in the county of Harford and State of Maryland, and at Baltimore, in the State of Maryland, have invented certain new and useful Improvements in Apparatus for Forming and Cutting Plastic Material, of which the following is a specification.

This invention relates to machines for forming and cutting plastic material, and it is especially designed for use in connection with the manufacture of "string" powder. In the manufacture of string powder, as at present carried out, it is the common practice to employ one machine for forming the strings from plastic material by means of dies, and another machine for cutting such strings into sections or "grains" of proper size. The material coming from the die machine is usually coiled in suitable receptacles, which are then transferred to the cutting machines into which the material is manually fed.

It is the object of the present invention to provide a machine which will perform both the die expressing and the cutting operations at the same time. This results in a marked saving of time and labor, and greatly simplifies the operation. The material from which this powder is made contains a large amount of volatile liquids, such as ether. When leaving the die, the material is, of course, very plastic, but evaporation of the volatile liquids takes place rapidly and it requires the close attention of a skilled operator to prevent the "strings" from becoming too hard before they are fed to the cutting machine. This difficulty is obviated by the use of our improved machine, as we provide means for automatically drying the material to exactly the desired extent before it reaches the cutting mechanism.

In order that the invention may be readily understood, reference is had to the accompanying drawing, forming part of this specification, and in which, Figure 1 is a plan view of our improved machine;

Figs. 2 and 3 are side elevations of the machine, taken at right angles to each other;

Fig. 4 is a plan view, on an enlarged scale, of the expressing cylinder and die;

Fig. 5 is a vertical, central section through the machine, on an enlarged scale, parts being omitted for the sake of clearness;

Fig. 6 is a vertical, sectional view through one of the dies and conditioning tubes on a still further enlarged scale;

Fig. 7 is a plan view of one of the dies shown in Fig. 6;

Figs. 8 and 9 are a section and plan, respectively, of the cutter which we preferably employ.

Referring to the drawings in detail, our improved machine comprises a suitable base 1, to which are secured a pair of spaced vertical standards 2. At the upper end of these standards is mounted a power cylinder 3, having perforated ears fitting over the standards and fastened down by means of nuts 4. A pipe 5 extends from the cylinder 3 to a three-way valve 6, with which are also connected supply and exhaust pipes 7 and 8, respectively. It is obvious that by turning the valve in one direction, fluid under pressure, such as water, will be admitted to the cylinder 3, while by turning the valve in the other direction the supply is shut off and the fluid permitted to exhaust.

Working within the power cylinder 3 is a piston 9, having a suitable packing ring 10. This piston is provided with perforate ears 11, which slide freely on the standards 2. To pins 12, set in these ears 11, is attached one end of a pair of cables 13, arranged one at each side of the machine, which cables pass upwardly over pulleys 14 and carry at their free ends counterweights 15. It is obvious that when the valve 6 is opened to exhaust, the counterweights 15 will raise the piston 9 and expel the motive fluid from the cylinder 3.

The lower end of the piston 9 carries a plunger 16, adapted to coöperate with a material cylinder 17. This latter is disposed immediately below the plunger 16, and is held in position between two pairs of collars 20, fixed to the standards 2. On one side the cylinder 17 is provided with a hook 18 and handle 18' (see Fig. 4), while on the other side it is formed with a split bearing 19, adapted to embrace one of the standards 2.

In the bottom of the cylinder 17 is set a number of suitable dies 22, each in the form of a screw plug having a nut 23 at its lower end. Referring to Fig. 6, it will be seen that each of these dies comprises a core member 26, having an enlarged head which fits in the end of the screw plug, through which head pass a circular series of openings 25. Below the head of the plug is a chamber 25', and in the bottom of this chamber is set an annular forming ring 26'. The lower end of the core 26 is reduced in diameter and extends through the ring 26', thus forming an annular space through which the material entering the chamber 25' through the holes 25 is expressed. Other constructions of die for giving any desired form to the expressed product may be employed without, of course, departing from the spirit of our invention.

Below the annular opening formed by the ring 26' is a downwardly flaring discharge opening 24, extending through the nut 23 and so shaped that the material issuing from the die does not touch the walls of the opening 24 except at its upper edge.

The bottom of the cylinder 17 is provided with a flange 17' which rests upon a table 27, provided at one side with a sleeve 28, loosely fitting one of the standards 2 and rigidly secured to the flange 17' as by means of bolts 29. By virtue of the flange 17', there is formed between the bottom 21 of the cylinder and the table 27, a compartment or chamber in which the nuts 23 of the dies are housed.

Near the bottom of the machine is provided a second table 30, having a sleeve 31, also fitting about the standard 2, and rigidly united with the sleeve 28 by means of a suitable coupling 32. The two tables 27 and 30, together with the cylinder 17, therefore constitute a rigid frame which is pivotally mounted on the standard 2 and is capable of swinging laterally therearound.

Supported by and extending between the two tables 27 and 30 is a series of conditioning tubes 33, the number of which corresponds with the number of dies 22 employed, one of said tubes being disposed immediately beneath each die. These tubes are preferably formed of gelatin, celluloid, or some other transparent, non-vitreous material. As shown in Fig. 6, the internal diameter of these tubes is approximately the same as that of the lower end of the flaring opening 24, and each tube forms a continuation of such opening. The tubes abut against the lower faces of the nuts 23, and each tube is provided at its upper edge with one or more notches or openings 35 for a purpose hereinafter described. A pipe 34, communicating with the space between the cylinder bottom 21 and table 27, is provided so that fluid under pressure may be introduced into such space.

The under side of the table 30 is recessed to receive a die plate 36, provided with a plurality of funnel-shaped openings 37, one immediately under each tube. Coöperating with the lower face of the die plate 36 is a reciprocating cutter 41, provided on its edges with slides 42, working in grooves formed in a pair of opposing guide members 38 and 39, locked to the standards 2 as by means of screws 40. The cutter 41 is of grid formation comprising a plurality of parallel bars 43, preferably set at an acute angle to the slides 42. In the upper side of each bar 43 is set a shearing knife or cutting member 44 which projects slightly above the plane of the grid bars 43. The upper edges of these shears or cutting members work against the lower face of the die plate 36. From a comparison of Figs. 4 and 9, it will be seen that the cutters are arranged substantially parallel with the diagonal rows of dies, but any other suitable or desired arrangement may be adopted.

The cutter 41 is reciprocated in the guides 38 and 39 by means of a pitman rod 46, coupled to the cutter at 45, and pivoted at its other end to a lever 47. The free end of this lever carries a roller which works in a cam slot 48, formed in the face of a driving wheel 49. This is mounted on a shaft 50, to which is also secured a suitable driving pulley 51. Other means for reciprocating the cutter may, of course, be employed, if desired, without departing from the scope of our invention.

Under the cutting mechanism, we preferably provide a traveling belt or conveyer 52, passing around pulleys 53 and 54, the latter of which is secured to a shaft 55 on which is also mounted a suitable driving pulley 56.

In operation, the cylinder 17, with the associated tubes, is swung laterally to the position indicated by dotted lines in Fig. 1, to receive a charge of plastic material. After having been charged, the cylinder is swung back into position under the plunger 16. The valve 6 being opened, motive fluid enters the pipe 5 and forces the plunger 16 down upon the material, thus expressing it through the dies 22. In the embodiment shown, the material is expressed in the form of a hollow tube. This passes freely down through the enlarged opening 24 and the conditioning tube 33, the force of gravity serving to maintain the material centered in the tube 33 and out of contact therewith. At the same time, gas or air under pressure is admitted through the pipe 34 and finds its way through the notches 35 into the tubes 33. The gas or air then passes downwardly through these tubes as a strong current, surrounding the "strings" of plastic material, and finally issuing from the openings 37 in the die plate 36. As soon as the plastic material reaches these openings, this downwardly moving gaseous current tends to assist gravity in forcing the material out through the openings 37 in the die plate. The main function of the air or gas is, however, to partially dry and harden the plastic material by removing the volatile liquids therefrom. The tubes 33 are made of such length, and the strength of the gaseous current so adjusted that by the time the plastic material has reached the die plate 36 and issues from the openings 37 therein, it will be in just the proper condition to be cut most effectively. As is well known in the powder industry, this condition is one intermediate between the initial plastic and eventual hard states. The speed of the reciprocating cutter 41 is so proportioned relative to the movement of the plunger 16, that the "strings" issuing from the die plate 36 are cut into sections of the proper or desired length, and these sections fall upon the belt or conveyer 52 and are thereby carried from the machine to suitable containers.

What we claim is:

1. In apparatus for forming plastic material, the combination with an expressing die, a cutting mechanism, and a conditioning tube through which the material passes on its way from said die to said cutting mechanism, 2. In apparatus for forming plastic material, the combination with an expressing die, a cutting mechanism, a conditioning tube through which the material passes on its way from said die to said cutting mechanism, and means for causing a current of fluid to flow through said tube around said material.

3. In apparatus for forming plastic material, the combination with an expressing die, of a vertical tube disposed below the same through which the expressed material passes by gravity, and a cutting die at the lower end of said tube for cutting the material into lengths.

4. In apparatus for forming plastic material, the combination with an expressing die, of a vertical tube disposed below the same through which the expressed material passes by gravity, a cutting die at the lower end of said tube, and means for causing a current of gas to flow downwardly through said tubes around said material, thus assisting in forcing the material through said cutting die.

5. In apparatus for forming plastic material, the combination with a cylinder and plunger, of a forming die in the bottom of said cylinder, a conditioning tube disposed below the die, a cutting die at the lower end of said tube, and a reciprocating cutter coöperating with said cutting die.

6. In a machine of the class described, the combination with a fixed frame having vertical guides, of a plunger working on said guides, a swinging frame disposed below said plunger, and an expressing cylinder and die, conditioning tube and cutting die carried by said frame.

7. In a machine of the class described, the combination with a fixed frame having vertical guides, of a plunger working on said guides, a pivoted, laterally swinging frame disposed beneath said plunger, an expressing cylinder and dies, conditioning tubes below said dies, and a cutting die plate at the lower end of said tubes, all of said parts being carried by said swinging frame, and a reciprocatory cutter coöperating with said die plate.

8. In a machine for forming string powder and the like, an expressing die and plunger, cutting mechanism arranged to operate continuously on the material issuing from said die, and means interposed between said die and cutting mechanism for hardening the material sufficiently to cause it to cut properly.

9. In a machine for forming string powder and the like from plastic material containing a volatile liquid, an expressing die, cutting mechanism arranged to operate on the material issuing from said die, and means interposed between said die and cutting mechanism for removing a predetermined definite part of such volatile liquid so as to properly condition said material for cutting.

In testimony whereof we affix our signatures.

HARLAN N. DUFFEE.
ARTHUR M. CUMMINGS.
CHARLES C. PARKER.

Witnesses:
JENNIE A. DUFFEE,
NELLIE M. CUMMINGS.